United States Patent [19]

Thornton

[11] Patent Number: 5,696,612
[45] Date of Patent: Dec. 9, 1997

[54] MULTIPLE DENSITY LEVEL STOCHASTIC SCREENING SYSTEM AND METHOD

[75] Inventor: Jay E. Thornton, Watertown, Mass.

[73] Assignee: Polaroid Corporation, Cambridge, Mass.

[21] Appl. No.: 434,651

[22] Filed: May 4, 1995

[51] Int. Cl.$^6$ .................................................. H04N 1/46
[52] U.S. Cl. ........................................ 358/534; 358/536
[58] Field of Search ............................... 358/534–536, 358/456–458, 429, 459, 298; 399/180–181; 395/109

[56] References Cited

U.S. PATENT DOCUMENTS

| | | | |
|---|---|---|---|
| 4,510,510 | 4/1985 | Terasawa | 346/140 R |
| 4,533,920 | 8/1985 | Suzuki | 346/1 |
| 4,533,923 | 8/1985 | Suzuki | 346/1.1 |
| 4,551,736 | 11/1985 | Suzuki | 346/140 R |
| 4,672,432 | 6/1987 | Sakurada et al. | 358/75 |
| 4,686,538 | 8/1987 | Kouzato | 346/1.1 |
| 4,695,846 | 9/1987 | Suzuki | 346/1.1 |
| 4,855,753 | 8/1989 | Ichikawa et al. | 346/1.1 |
| 4,860,026 | 8/1989 | Matsumoto et al. | 346/1.1 |
| 4,897,736 | 1/1990 | Sugino | 358/457 |
| 4,959,659 | 9/1990 | Sasaki et al. | 346/1.1 |
| 5,291,311 | 3/1994 | Miller | 358/456 |

FOREIGN PATENT DOCUMENTS

| | | | |
|---|---|---|---|
| 359080A2 | 9/1989 | European Pat. Off. | G09G 1/28 |
| 547382A1 | 11/1992 | European Pat. Off. | H04N 1/40 |
| 650289A1 | 9/1994 | European Pat. Off. | H04N 1/40 |

Primary Examiner—Edward L. Coles, Sr.
Assistant Examiner—Stephen Brinich
Attorney, Agent, or Firm—Robert A. Sabourin

[57] ABSTRACT

An image rendering system for generating discrete tone image data for representing continuous tone image data to be rendered by a rendering device. The continuous tone image data includes a plurality of pixel values each associated with a pixel. The rendering device renders a colorant in a plurality of colorant densities. The image rendering system comprises a threshold array, preferably stochastic, a colorant density array, and a colorant density supply arrangement. The threshold array comprising a plurality of threshold values. The colorant density array comprises a plurality of array elements, each associated with one of said pixel values and one of said threshold values. Each of the array elements identifies a particular one of a plurality of colorant density values each associated with one of the colorant densities rendered by said rendering device. The colorant density supply arrangement, for each pixel, uses the pixel value associated with the pixel and a threshold value from the threshold array to identify an array element of the colorant density array, whose colorant density value will be rendered by rendering device for the pixel in the rendered image.

10 Claims, 3 Drawing Sheets

MULTIPLE DENSITY LEVEL STOCHASTIC SCREENING SYSTEM AND METHOD

FIELD OF THE INVENTION

The invention relates generally to the field of processing and rendering of digital images and more particularly to systems and methods for generating multiple-level discrete-tone image data from continuous-tone image data.

BACKGROUND OF THE INVENTION

Several techniques have been developed for rendering of continuous-tone images, represented by image data in which values of picture elements ("pixels") may take on values between, for example, black and white, using discrete-tone media or display devices in which rendered pixels may take on only two or a few pixel values, such as black and white. Generally, the techniques attempt to generate, for various regions of the continuous-tone images representing, for example, a particular shade of gray (that is, a "tone"), a combination of black and white pixels in the rendered image which, to the eye, appears to have the corresponding shade of gray. For example, a region of the continuous-tone image which is fifty-percent gray, or half-way between black and white, would be represented by a discrete-tone region in which one-half of the pixels would be white, and the other half would be black. For a color image, each color is generally processed separately, so that pixel values representing the intensity of, for example, red, green and blue ("RGB"), cyan, magenta, and yellow ("CMY"), or cyan, magenta, yellow and black ("CMYK") for the pixels in an image would be generated independently.

In one rendering technique, termed "error diffusion," the continuous-tone image data is processed pixel by pixel, and discrete-tone pixel data is generated for each pixel. Error diffusion systems generally process the image data by scanning across successive lines in the image, generally starting from, for example, the upper left-hand corner of the image. In generating pixel data for the first pixel, an error diffusion system will generate a discrete-tone pixel value in response to the continuous tone pixel value for the pixel based on a selected threshold value. If, for example, the continuous-tone pixel value is represented by numerical values between zero (representing black) and two hundred and fifty five (representing white), the discrete tone pixel value (either zero for black or two hundred and fifty five for white) will be determined based on whether it is above or below the threshold value, which will generally be selected to be half way through the range of values that the continuous tone pixel data may take on. In generating a value for the second pixel, the error diffusion system will also generate a discrete-tone pixel value in response to threshold value, but instead of only using the pixel's continuous-tone pixel value, it will generate an adjusted continuous-tone pixel value corresponding to the sum of its continuous-tone pixel value and the difference between the discrete-tone pixel value generated for the first pixel and the first pixel's continuous tone pixel value (that is, the "error"), the error being weighted according to a selected weighting function. The result is then compared to the threshold value and a discrete-tone pixel value generated in response. This operation is repeated for each pixel, across the first line, and across pixels of successive lines, with an error-adjusted continuous tone pixel value being generated for each pixel using the errors generated for previously-processed pixels taken in relation to a weighting function. The point of this technique is that the errors, which, generally speaking relate to the difference between the luminance represented by the discrete-tone image data and the continuous-tone image data for correspondingly-positioned pixels, are diffused throughout the discrete-tone image from the upper left-hand corner of the image toward the right and downwardly through the image, with the degree of diffusion being related to the selected weighting function. Thus, while the luminance represented by the discrete-tone pixel value for any particular pixel may be considerably different from the continuous-tone pixel level for a given pixel, over a group of pixels the errors tend to even out so that the discrete-tone image is perceptually similar to the continuous-tone image.

While the error diffusion technique produces generally accurate pleasing rendered images, it will be appreciated that a considerable amount of processing is required to generate discrete-tone image data for an image. To reduce the amount of processing required, another technique, termed a "stochastic screen" technique, has been developed. In a system which operates in accordance with the stochastic screen technique, a stochastic threshold array is generated which has array elements organized in a selected number of rows and columns. Each array element of the stochastic threshold array is a threshold value. In generating the discrete-tone image values, the stochastic threshold array is essentially tiled over the continuous-tone pixel values, and the discrete-tone pixel values are generated in response to a comparison between continuous-tone pixel values for the pixels and threshold values of correspondingly-positioned stochastic threshold array elements. The stochastic threshold array is generated from an optimized pattern, which in turn is generated from a seed pattern that comprises an array in which the various array elements are initially randomly assigned binary values. The seed pattern is processed to provide for selected distribution characteristics, and the stochastic threshold array generated after the distribution characteristics have been achieved. Typically, the optimized patterns and associated stochastic threshold arrays can be generated in advance of processing of the image data, since they normally do not depend on the continuous-tone image data for a particular image. Since the continuous-tone pixel values for the continuous tone image are compared, pixel for array element, with the array elements of the tiled stochastic threshold array, and do not depend on processing in connection with neighboring pixels, the processing of the pixels can take place in parallel, which can speed up processing of the image as a whole.

While systems operating in accordance with stochastic screening techniques are generally straight-forward to apply in connection with half-tone image rendering, in which the rendering device can render output images using two possible discrete tone pixel values (such as the above-described zero for black or two hundred and fifty five for white), they are more difficult to apply when the number of possible discrete-tone pixel values increases beyond two. This may occur, for example, in a gray scale image rendered by a rendering device which can render several densities or shades of gray, or in a color image rendered by a rendering device which can render some or all of the colors (for example, cyan, magenta, yellow and gray/black, or "CYMK") in several densities. Each density or shade of gray in a gray-scale image, or of each color in a color image, is represented by one of a number of the discrete-tone pixel values to be generated.

In one multiple-level stochastic screening technique, each discrete-tone pixel value for a pixel is generated from the continuous-tone pixel value for the corresponding pixel as the sum of a coarsely-quantized pixel value and a scaled thresholded pixel value. In generating the coarsely quantized pixel values, the range of possible continuous-tone pixel values is divided into a series of sub-ranges, and successive sub-ranges are associated with successive ones of the coarsely-quantized pixel values. The scaled thresholded pixel value is generated by scaling the continuous-tone pixel value and/or the threshold array values in relation to the range between successive quantization levels selected for the coarse quantization, determining whether the scaled continuous-tone pixel value is larger or smaller than the scaled threshold array value, and generating a value, which corresponds to the scaled thresholded pixel value, in response to the determination. It will be appreciated that, in this technique, if there are "2N+1" density levels, where "N" is an integer, the discrete-tone pixel value can be generated using relatively simple digital binary bit operations in which the coarsely-quantized pixel values comprise the most-significant bit(s) of a binary digital word, and the scaled thresholded pixel values comprise less-significant bit(s) of the word. However, if the number of density levels differs from "2N+1," this technique is more complex to apply.

SUMMARY OF THE INVENTION

The invention provides a new and improved image rendering system for rendering discrete-tone images using rendering colorants having multiple colorant densities.

In brief summary, the new image rendering system generates discrete tone image data for representing continuous tone image data to be rendered by a rendering device. The continuous tone image data includes a plurality of pixel values each associated with a pixel. The rendering device renders a colorant in a plurality of colorant densities. The image rendering system comprises a stochastic threshold array, a colorant density array, and a colorant density supply arrangement. The stochastic threshold array comprises a plurality of threshold values. The colorant density array comprises a plurality of array elements, each associated with one of said pixel values and one of said threshold values. Each of the array elements identifies a particular one of a plurality of colorant density values each associated with one of the colorant densities rendered by said rendering device. The colorant density supply arrangement, for each pixel, uses the pixel value associated with the pixel and a threshold value from the stochastic threshold array to identify an array element of the colorant density array, whose colorant density value will be rendered by the rendering device.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
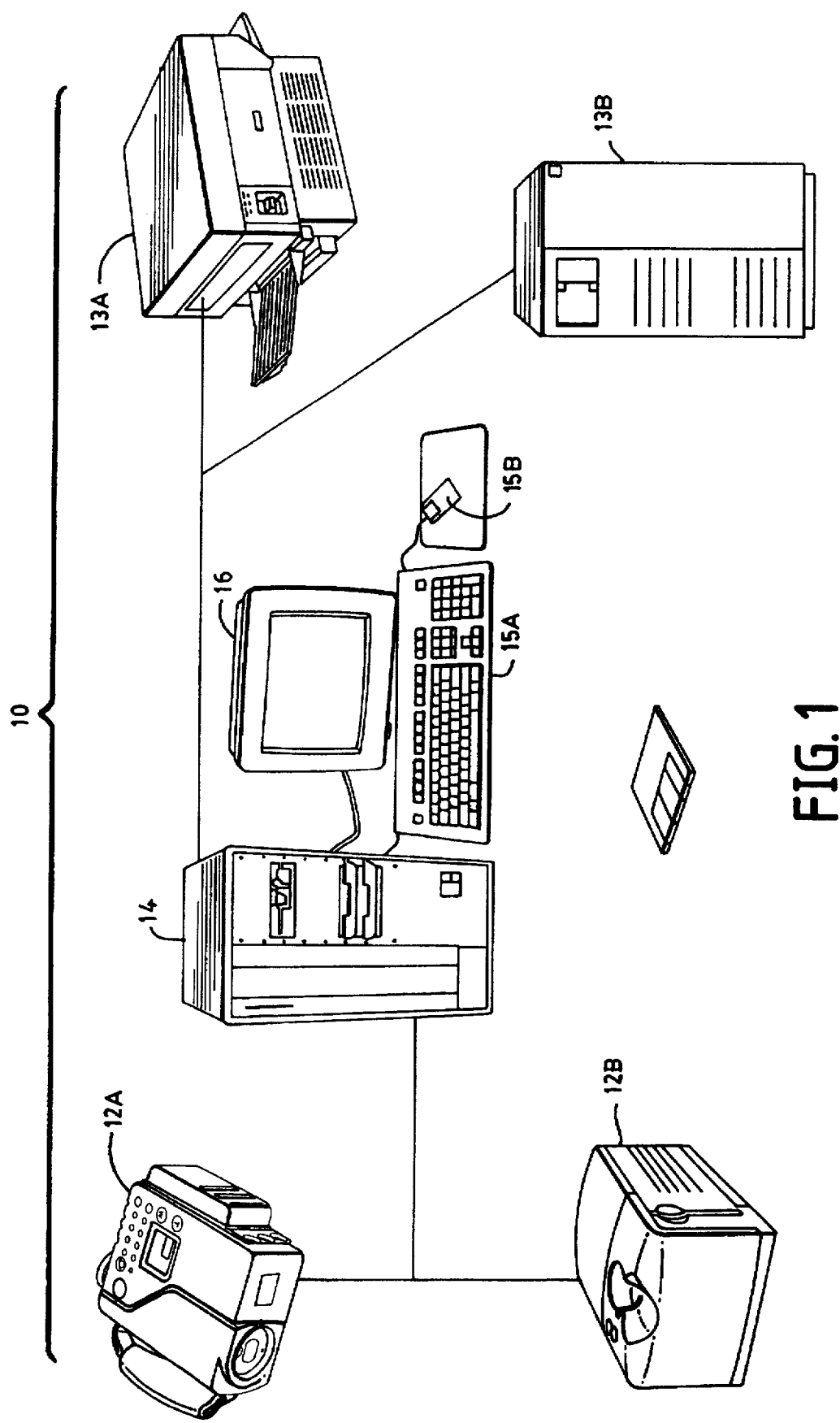
FIG. 1 is an illustrative computer system including a multiple-level stochastic screening system constructed in accordance with the invention.

FIG. 1 is a diagram of a computer system 10 including a multiple-level stochastic screening system 18 (FIG. 2) constructed in accordance with the invention. With reference to FIG. 1, the computer system 10 in one embodiment includes a computer 11, one or more image acquisition devices represented by a camera 12A and a thirty-five millimeter slide scanner 12B (generally identified by reference numeral 12), for acquiring an image and converting it to continuous-tone digital image data, and one or more image rendering devices represented by a printer 13A and a raster image processor 13B (generally identified by reference numeral 13) for generating an output image. The computer 10, which in one embodiment is a general-purpose stored-program digital computer which comprises the multiple-level stochastic screening system 18, receives the continuous-tone digital image data, and processes it in relation to stochastic threshold arrays as described below in connection with FIGS. 2 and 3 to generate multiple-density discrete-tone digital image data to be rendered by, for example, an image rendering device 13.

As is conventional, the computer 10 includes a processor module 14 and operator interface elements comprising operator input components such as a keyboard 15A and/or a mouse 15B (generally identified by reference numeral 15) and operator output elements such as a video display device 16. The processor module 14 includes, for example, processor, memory and mass storage devices such as disk and/or tape storage elements (not separately shown) which perform processing and storage operations in connection with digital data provided thereto. When operating in accordance with the multiple-level stochastic screening system 18, the computer system 10 will generally be processing certain programs which enable it to establish elements and perform selected operations as described below in connection with FIGS. 2 and 3. The operator input elements 15 are provided to permit an operator to input information for processing, including information for controlling the image processing operations. The video display device 16 is provided to display output information to the operator, such as information identifying certain selections the operator may make in connection with the processing of the image data. Although the computer system 10 is shown as comprising particular components, such as the keyboard and mouse for receiving input information from an operator, and a video display device for displaying output information to the operator, it will be appreciated that the computer system 10 may include a variety of components in addition to or instead of those depicted in FIG. 1.

Although the computer system 10 in one embodiment has been depicted as receiving continuous-tone image data from particular types of image acquisition devices 12, such as the camera 12A and a thirty-five millimeter scanner 12B, and particular types of image rendering devices 13, such as a printer 13A and a raster image processor 13B, it will be appreciated that numerous other types of image acquisition devices 12 and image rendering devices 13 may be used in connection with the computer system 10.

Although one embodiment of the multiple-level stochastic screen system 18 has been indicated as comprising elements of a general-purpose stored-program computer system 10, it will be apparent to those skilled in the art that the system 18 may alternatively include special-purpose hardware and/or program components, or a combination of a computer system 10 with special-purpose hardware and/or program components.

Figure 2:
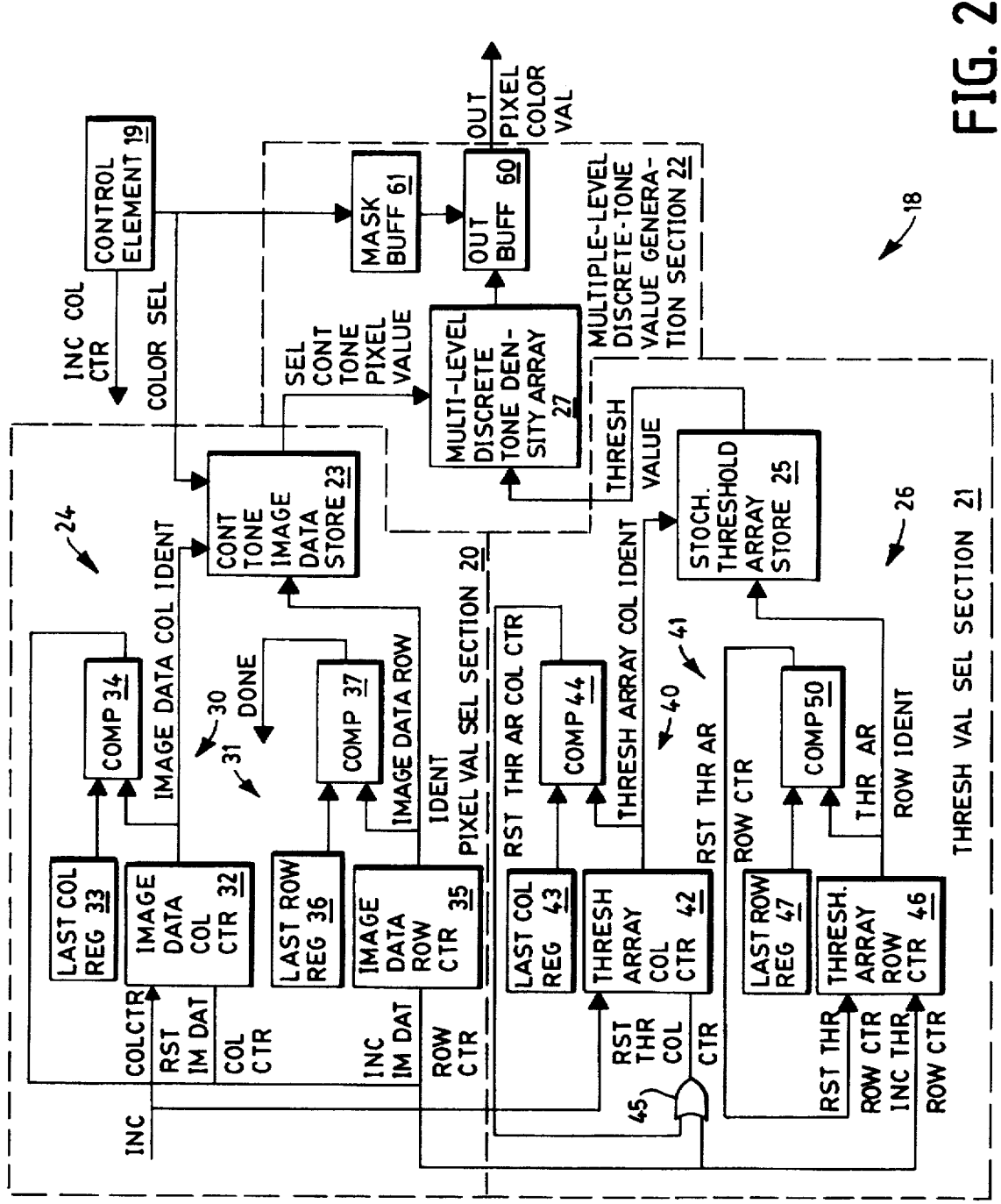
FIG. 2 is a functional block diagram of a multiple-level stochastic screening system constructed in accordance with the invention.

FIG. 2 is a functional block diagram of the multiple-level stochastic screening system 18 constructed in accordance with the invention. Generally, the system 18 receives an input image data array, comprising continuous-tone image data for an image, and, using a stochastic threshold array and a discrete-tone colorant density array, generates discrete-tone output image data for rendering by a rendering device. For a two-dimensional image, the continuous-tone image data will be in the form of a two-dimensional array of picture elements, or "pixels," and the continuous-tone image data for each pixel comprises a pixel value which represents a measure of the intensity of the pixel. The multiple-level stochastic screening system 18, in generating discrete-tone image data for a pixel, selects continuous-tone image data for a pixel and a threshold value from the stochastic threshold array (in a manner to be described below in connection with FIG. 2) and uses the selected continuous-tone image data and the threshold value to identify a particular element in the discrete-tone colorant density array. The identified element in the discrete-tone density array corresponds to the discrete-tone image data for the pixel, and may be used in rendering the pixel by the image rendering device 13 (FIG. 1).

More specifically, the multiple-level stochastic screening system 18 as shown in FIG. 2 includes a pixel value selection section 20, a threshold value selection section 21 and a multiple-level discrete-tone value generation section 22, all under control of a control element 19. The pixel value selection section 20, under control of a control element 19, provides continuous-tone pixel values from the continuous-tone image data, which is stored in an array 23. The continuous-tone image data for a two-dimensional image will be in the form of a two-dimensional array, with each array element containing a pixel value, and the storage array 23 will have a number of storage locations organized in a plurality of rows and columns, each for storing a pixel value. It will be appreciated that the storage array 23 will have at least a number of rows and columns which depend on the height and width of the image and the resolution, that is, the number of pixels per unit of distance along the height and width of the image. For a gray-scale image, the continuous tone image data for each pixel constitutes a value which is generally constrained to an integral value within a selected range, such as between zero and two hundred and fifty five, which can be quantized to an eight-bit digital data word. For a color image, the continuous-tone image data for each pixel will comprise a pixel value which, in turn, will have a color value for each of the primary colors (in one embodiment, the aforementioned cyan, magenta, yellow, and gray/black color scheme) in which the image is encoded.

The threshold value selection section 21, as described below in more detail, under control of the control element 19 provides thresholding values from a threshold array which is stored in a store 25. In one embodiment, the threshold array is preferably a stochastic threshold array, but it will be appreciated that any threshold array may be used with multiple-level stochastic screening system 18. If a stochastic threshold array is used, the stochastic threshold array may be generated in a conventional manner, or in a manner described in U.S. patent appn. Ser. No. 08/427,880 filed Apr. 28, 1995 in the names of Bernd W. Kolpatzik and Jay E. Thornton, entitled System And Method For Generating Stochastic Threshold Array(s) For Use In Rendering Images. The stochastic threshold array includes a plurality of array elements organized in a plurality of rows and columns (in one embodiment, thirty-two rows and thirty-two columns) each of which includes a threshold value. The store 25 includes a number of storage locations, organized into rows and columns, corresponding to the number of rows and columns in the stochastic threshold array, with each storage location storing one element of the stochastic threshold array.

The multiple-level discrete-tone value generation section 22 receives the continuous-tone image data for each pixel from the pixel value selection section 20, and threshold values from the threshold value selection section 21, and, under control of the control element 19, generates the multiple-level discrete-tone pixel values for the pixel, to be used in rendering the multiple-level discrete-tone image by the rendering device 13. The multiple-level discrete tone value generation section 22, which is shown in greater detail in FIG. 3, includes a multiple-level discrete-tone density array 27, which includes a number of entries, each associated with one of the possible continuous-tone pixel values and one of the possible threshold values, which identifies the colorant density to be used. Accordingly, when the pixel value selection section 20 selects a pixel value for a pixel and the threshold value selection section 21 selects a threshold value to be used in connection with rendering the pixel, the multiple-level discrete-tone value generation section 22 enables the contents of the entry in the multiple-level discrete-tone density array 27 that is associated with the pixel value and the threshold value to be used in generating a discrete-tone pixel value for rendering the pixel in the discrete-tone image. It will be appreciated that, since, in a color image, the pixel value provided by the pixel value selection section 20 for a particular pixel may comprise different values for the various colors, the multiple-level discrete-tone value generation section 22 may make use of multiple entries in the array 27 in generating a discrete-tone pixel value, with each entry being used to provide a density value for a particular colorant that is used by the rendering device 13 in rendering the pixel in the discrete-tone image.

As noted above, the pixel value selection section 20 and the threshold value selection section 21, under control of the control element 19, provide continuous-tone image data and threshold values for use by the multiple-level discrete-tone value generation section 22. As noted above, the pixel value selection section 20 includes the input image data store 23 for storing the input image data, and in addition includes an input image data addressing section 24 which selects pixel values from the input image data array for coupling to the output code generator section. The threshold value selection section 21 includes the stochastic threshold array store 25 and in addition includes a threshold array addressing section 26 which, in synchrony with the operation of the input image data store addressing section 24, selects threshold values from the stochastic threshold array store 25.

The input image data addressing section 24 includes a column addressing element 30 and a row addressing element 31. In the embodiment depicted in FIG. 2, the input image data addressing section addresses the input image data store 23 to provide pixel values for pixels in successive columns across each row from, for example, left to right across the image, and in successive rows from the top towards the bottom of the image. The column addressing element 30 and row addressing element 31 provide column and row address portions which, in combination, identify one location in the input image data store 23. The column addressing element 30 includes a column counter 32, a register 33 and a comparator 34. The column counter 32 generates the column address which is provided by the column addressing element 30. The column counter 32 is initialized to point to the first column in the input image data store 23, and increments to identify locations in successive columns in response to successive ticks of an INC COL CTR increment column counter indication from the control element 19. The register 33 stores a column increment termination value, which corresponds to the number of columns of input image pixel data in the input image data store 23. Both the column address from the column counter 32, and the column increment termination value from the register 33, are provided to the comparator, which generates a RST IM DATA COL CTR reset image data column counter indication to enable the column counter 32 to be reset. Resetting of the column counter 32 occurs when it has incremented to identify the last column of the input image data store 23 containing input image data, and enables the column counter 32 to resume counting from the first column of the input image data store.

Similarly, the row addressing element 31 includes a row counter 35, a register 36 and a comparator 37. The row counter 35 generates the row address which is provided by the row addressing element 31. The row counter 35 is initialized to point to the first row in the input image data store 23, and increments to identify successive rows in response to INC IM DATA ROW CTR increment image data row counter indication, which corresponds to RST IM DATA COL CTR reset image data column counter indication from the column addressing element 31. Accordingly, when the column addressing element 30 resets as described above, the row counter 35 increments to point to the next row. The register 36 stores a row increment termination value, which corresponds to the number of rows of locations in the input image data store 23 containing input image pixel data. Both the row address from the row counter 35, and the row increment termination value from the register 36, are provided to the comparator 37, which generates a DONE indication indicating that the multiple-level stochastic screening system 10 has processed all input image data provided thereto.

As described above, the threshold value selection section 21 includes a stochastic threshold array store 25 and a threshold array addressing section 26. The threshold value selection section 21 provides threshold values which are used, along with the input pixel image data from the pixel value selection section 20, by the multiple-level discrete-tone value generation section 22 in generating the output pixel value for rendering by the rendering device. In one embodiment, the stochastic threshold array is an array comprising numerical array elements organized into one hundred and twenty-eight rows and one hundred and twenty-eight columns, although it will be appreciated that threshold arrays of other sizes may also be used. The threshold array addressing section 26 includes a column addressing element 40 and a row addressing element 41. In the embodiment depicted in FIG. 2, the threshold array addressing section 26 addresses the stochastic threshold array store 25 to provide for the tiling of the stochastic threshold array stored in store 25 over the input image data stored in input image data store 23.

The column addressing element 40 and row addressing element 41 provide column and row address portions which, in combination, identify one location in the stochastic threshold array store 25, whose contents are used by the multiple-level discrete-tone pixel value section 22 along with the continuous-tone pixel value provided by the pixel value selection section in generating the output pixel value. The column addressing element 40 includes a column counter 42, a register 43, a comparator 44 and an OR element 45. The column counter 42 generates the column address which is provided by the column addressing element 40. The column counter 42 is initialized to point to the first column in the stochastic threshold array store 25, and increments to identify locations in successive columns in response to successive ticks of the INC COL CTR increment column counter indication from a control element 19.

Accordingly, the threshold value selection section 21 will advance across successive columns of each row in synchrony with advancement across the columns of the input image data by the pixel value selection section 20.

The register 43 stores a column increment termination value, which corresponds to the number of columns in the stochastic threshold array (that is, the value one hundred and twenty-eight in the above-described embodiment). Both the column address from the column counter 42, and the column increment termination value from the register 43, are provided to the comparator 44, which generates a RST THR COL CTR reset threshold array column counter indication which energizes one input of the OR element 45 to enable the column counter 42 to be reset. Resetting of the column counter 42 in response to the RST THR COL CTR indication occurs when it has incremented to identify the last column of the threshold array store 25 and enables the column counter 42 to resume counting from the first column of the stochastic threshold array. The second input of the OR element 45 is energized in response to the RST IM DAT COL CTR reset image data column counter indication from the column addressing element 30 of the pixel value selection section 20, to enable the column counter 42 to be reset when the pixel value selection section has finished with a row of pixel values from the image data store 23.

Similarly, the row addressing element 41 includes a row counter 46, a register 47 and comparator 48. The row counter 46 generates the row address which is provided by the row addressing element 41. The row counter is initialized to point to the first row in the input image data store 23, and increments to identify each successive row in response to an INC THR ROW CTR increment threshold array row counter indication, which corresponds to the RST IM DATA COL CTR indication from the column addressing section of the pixel value selection section 20. Accordingly, the row counter 46 is incremented in synchrony with incrementation of the row counter 35 of the pixel value selection section 20 so that, as the pixel value selection section 20 provides pixel values from successive rows of the input image data from the image data store 23, the threshold value selection section will provide threshold values from successive rows of the stochastic threshold array from the threshold array store 25. The register 47 stores a row increment termination value, which corresponds to the number of rows in the stochastic threshold array, which, in turn, corresponds to the number of rows of locations in the threshold array store 25. Both the row address from the row counter 46, and the row increment termination value from the register 47, are provided to the comparator 50, which generates a RST THR ROW CTR reset threshold array row counter indication to enable the row counter 46 to be reset. Accordingly, after the row addressing element 41 has enabled the last row of the stochastic threshold array to be provided by the threshold value selection section 21, the row counter 46 resets and begins enabling threshold values to be provided from the stochastic threshold array's first row.

As described above, the multiple-level discrete-tone value generation section 22, in response to the selected continuous-tone image data for each pixel of the continuous-tone image data as provided by the pixel value selection section 20 and the selected threshold values as provided by the threshold value selection section 21, generates the multiple-level discrete-tone pixel value for each pixel for rendering by the rendering device 13. The section 22 includes the multiple-level discrete-tone density array 27, and in addition includes an output buffer 60 and a color mask buffer 61, all of which are shown in greater detail in FIG. 3.

along with a selected pixel value buffer 63 (not shown in FIG. 2) for buffering the selected continuous-tone image data for each pixel as provided by the continuous-tone image data storage array 23 and a threshold value buffer 64 (also not shown in FIG. 2) for buffering each threshold value as provided by the stochastic threshold value array 25.

Figure 3:
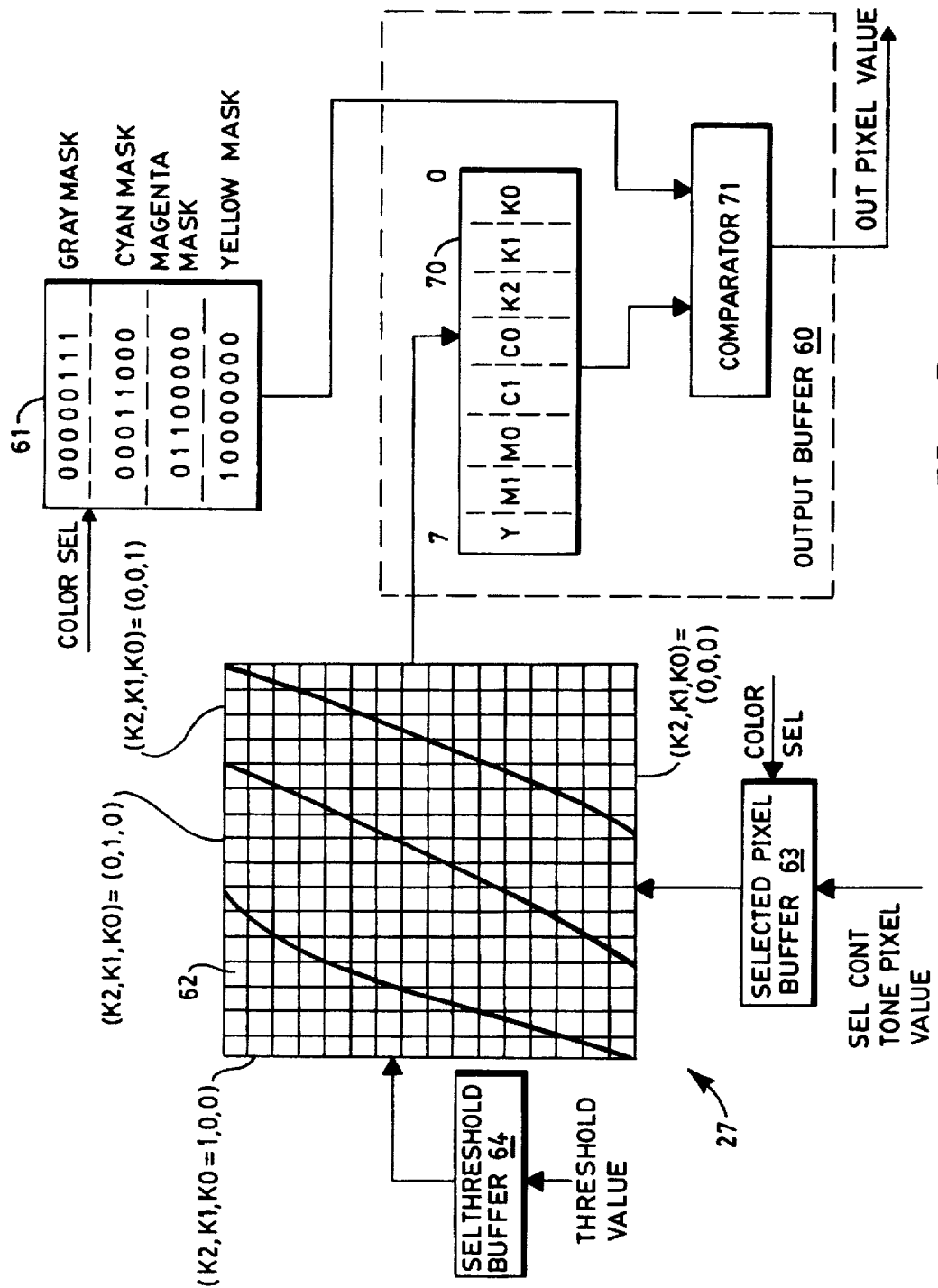
FIG. 3 is a diagram useful in understanding the operation of the system depicted in FIG. 2.

With reference to FIG. 3, the array 27 includes a number of entries 62, each of which stores colorant density values for each of the colors to be rendered by the rendering device 13. In one embodiment, in which the rendering device can render three gray levels, two cyan levels, two magenta levels and one yellow level, each entry 62 comprises an eight-bit digital data word, with one bit position being allocated to each of the density levels for each of the diverse colors. In that embodiment, the three low-order bit positions are allocated to the three gray density levels "K2," "K1," and "K0," the next two higher-order bit positions are allocated to the two cyan density levels "C1" and "C0," the next two higher-order bit positions are allocated to the two magenta density levels "M1" and "M0," and the highest-order bit position is allocated to the yellow density level "Y," so that each word would have bit positions which are allocated (Y,M1,M0,C1,C0,K2,K1,K0). The index "0," "1" and "2" associated with each color identifier "C," "M" and "K" identifies a colorant density for the associated color, with increasing index values representing increasing colorant densities. It will be appreciated that, since, in rendering a particular pixel, the rendering device will generally use at most one density for any particular color, an entry 62 will normally have at most one of the K2, K1 and K0 bits set, at most one bit of the C1 and C0 bits set, and at most one of the M1 and M0 bits set, with the set bit identifying the corresponding colorant density to be used if the particular entry 62 is selected in response to a particular continuous-tone pixel value and a particular threshold value.

FIG. 3 depicts the array 27 as being divided into four regions, namely, (i). a region identified by the legend "(K2,K1,K0)=(1,0,0)," which is generally associated with entries 62 for relatively high threshold values and relatively low continuous-tone pixel values;

(ii). a region identified by the legend "(K2,K1,K0)=(0,0,0)," which is generally associated with entries 62 for relatively low threshold values and relatively high continuous-tone pixel values; and (iii). regions "(K2,K1,K0)=(0,1,0)" and "(K2,K1,K0)=(0,0,1)" associated with entries 62 in regions located between the above-described regions, with region "(K2,K1,K0)=(0,1,0)" being generally associated with the region generally associated with entries 62 for lower continuous-tone pixel values and higher threshold values than the region generally associated with region "(K2,K1,K0)=(0,0,1)".

The entries 62 in the region identified "(K2,K1,K0)=(1,0,0)," comprise those entries 62 which, if identified by the continuous-tone pixel data and the threshold data provided thereto, would indicate gray color with high-density colorant "K2." Similarly, the entries 62 in region "(K2,K1,K0)=(0,1,0)," comprise those entries 62 which, if identified by the continuous-tone pixel data and the threshold data provided thereto, would indicate gray color with intermediate-density colorant "K1." In addition, the region "(K2,K1,K0)=(0,0,1)," comprises those entries 62 which, if identified by the continuous-tone pixel data and the threshold data provided thereto, would indicate gray color with low-density colorant "K0." Finally, the region identified "(K2,K1,K0)=(0,0,0)," comprises the entries 62 which, if identified by the continuous-tone pixel data and the threshold data provided thereto, would indicate that no gray color is to be applied, which effectively corresponds to the color "white" (or "paper," indicating that no pixel of any density of the gray colorant will be deposited on the medium)

In one embodiment, including the above-described densities for colors cyan, magenta and yellow in addition to those described above for color gray, entries 62 would, in addition to the colorant density values for K2, K1 and K0, also include values defining regions (not shown) for colors cyan, magenta and yellow, which are constructed in a similar manner as those for the color gray as described above in connection with FIG. 3. It will be appreciated that the regions of entries 62 in array 27 associated with the different colorant densities may differ as among the various colors.

As described above, for a color image, each pixel will have separate continuous-tone pixel values for each of the various colors. In that case, entries 62 will be individually selected for each of the colors. For each color, as indicated by a COLOR SEL color select indication from the control element 19, the continuous-tone pixel value for the corresponding color is used to identify an entry 62 in the array 27, and the contents of the identified entry are coupled to the buffer register 70. The contents of the buffer register 70 are coupled to one input of an output comparator 71.

The output buffer 60, along with the mask buffer 61, cooperate to select the specific bit or bits of the contents of the entry 62 in the array 27, which is selected in response to the continuous-tone pixel value and threshold value, which are associated with the color identified by the COLOR SEL color select indication. The mask buffer 61 includes a plurality of mask registers 61(G), 61(C), 61(M) and 61(Y), each of which is associated with one of the colors gray, cyan, magenta and yellow, respectively. Each of the mask registers has one or more bits which are set in bit positions which correspond to those bit positions in the entries 62 which are associated with one of the respective colors gray, cyan, magenta and yellow, with the remaining bits in each mask register being cleared. The COLOR SEL color select indication from the control element 19 selects one of the mask registers whose contents are coupled to the other input of output comparator 71. It will be appreciated that, since the COLOR SEL color select indication is used both in selecting the particular color of the continuous-tone pixel value to be used in selecting an entry 62 of the array 27, and in selecting the particular color mask in mask registers 61(G), 61(C), 61(M) and 61(Y), the contents of the selected mask register are coupled to the second input of the output comparator 71.

The output comparator 71 uses the contents of the selected mask register provided by mask buffer 61 to select the portions of the contents of buffer register 70 to be coupled to the rendering device 13 as the multiple-level discrete-tone output pixel value for the color associated with the COLOR SEL color select indication. In that operation, the comparator 71 performs a bit-wise comparison between the contents of buffer register 70 and the bits of the selected mask register. Since the selected mask register includes set bits in the bit positions associated with the color associated with the COLOR SEL color select indication, if a bit in the buffer register 70 associated with that color is set, that bit will be coupled to the rendering device 13 to identify the particular density to be used for that color.

It will be appreciated that the control element 19 will enable the COLOR SEL color select indication to cycle through all of the colors for the continuous-tone image data, so that the array 27, output buffer 60 and color mask 61 will repeat the above-described operations in connection with each of the colors. After cycling through all of the colors, the control element 19 will enable the pixel value selection section 20 and threshold value selection section 21 to provide continuous-tone image data for a new pixel and a new threshold value as described above. The control element will repeat these operations in connection with each of the pixels whose data is stored in the continuous-tone pixel value array 23, to enable multiple-value discrete-tone pixel values to be generated for rendering by the rendering device 13.

The multiple-level stochastic screening system 18 provides a number of advantages. Since the system 18 uses an array 27 in identifying colorant density values for respective pixel values and threshold values, the density values can be easily modified merely by modifying the values stored in the array.

It will be appreciated that numerous modifications may be made to the image rendering system 18. For example, although system 18 has been described as including a store 23 (FIG. 2) to buffer and store the continuous-tone image data to be provided to the multiple-level discrete-tone value generation section 22, it will be appreciated that the continuous-tone image data may be provided in a stream directly from, for example, an image acquisition device 12 without being buffered in a storage device such as store 23. Modifications to the system 18 which will accommodate such an arrangement will be apparent to those skilled in the art.

In addition, system 18 has been described so that each selected continuous-tone pixel value provided to the multiple-value discrete-tone value generation section 22 includes values for each of the colors, with the section 22 generating the discrete-tone pixel values for all of the colors for a pixel before the next selected continuous-tone pixel value is provided. It will be appreciated, however, that the section 22 may instead process the various colors in a series of iterations, with the continuous-tone image data for one of the colors being processed for all of the pixels in each iteration. Modifications to the system 18 which will accommodate such an arrangement will be apparent to those skilled in the art.

Furthermore, although system 18, in connection with rendering of color images, has been described as using the same stochastic threshold array in store 25 for all of the colors in which the images are rendered, it will be appreciated that the system may instead use different stochastic threshold arrays for the different colors. This may have the advantage that mis-registration of the various colors as rendered by the rendering device, which may be noticable in the rendered image if the same threshold array is used for all of the colors, may not appear as noticable. In addition, the stochastic threshold arrays for the various colors may be of different sizes (that is, of different numbers of rows and columns) which may reduce stochastic threshold array tiling edge effects which may arise if the same size arrays are used for all of the colors. Modifications to the system 18 which will accommodate such arrangements will be apparent to those skilled in the art.

In addition, while the multiple-level discrete-tone density array 27 has been described as including array elements 62 in which each colorant density value of each different colorant is associated with a unique bit of the words stored in the respective elements 62, it will be appreciated that the colorant density values may be binary encoded. In that case, each group of "N" bits that are allocated to each colorant may identify $2^N$ density values, and a decoder may be provided to decode the binary encoding to identify the particular colorant density value to be used. Alternatively, if each bit is associated with a colorant density value, several bits allocated to a colorant may be set to indicate that colorants of all of the associated pixels are to be used in pixel rendering. Modifications to the system 18 which will accommodate such arrangements will also be apparent to those skilled in the art.

It will be appreciated by those skilled in the art that the multiple-level stochastic screening system 10 can be implemented in special-purpose hardware, in a suitably-programmed general purpose digital computer, or in a combination thereof. In an implementation comprising special purpose hardware, the various elements depicted in FIGS. 2 and 3 may represent electronic components and the items described above as "indications" may represent electrical signals. On the other hand, in an implementation comprising a programmed general purpose digital computer the various elements depicted in FIGS. 2 and 3 may represent data elements and data structures which are manipulated by program instructions as described above, and "indications" comprise the states of such data elements or structures which are used in controlling the operations of the computer The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. An image rendering system for generating discrete tone image data for representing continuous tone image data to be rendered by a rendering device, the continuous tone image data including a plurality of pixel values each associated with a pixel, the rendering device rendering a color using a plurality of colorants each having an associated colorant density, the image rendering system comprising:

A. means for providing a threshold array including a plurality of threshold values;

B. means for providing continuous variation in both image dot frequency and the colorant density by use of a colorant density array comprising a plurality of array elements each associated with a unique one of said pixel values and of said threshold values, each array element identifying a particular one of a plurality of colorant density values each associated with one of the colorant densities rendered by said rendering device; and C. colorant density supply means for, for each pixel, using the pixel value associated with the pixel and a threshold value from the threshold array to identify an array element of the colorant density array, the colorant density supply means supplying the colorant density value of the identified array element to the rendering device for rendering.

2. An image rendering system as defined in claim 1 in which the threshold array comprises a stochastic threshold array.

3. An image rendering system as defined in claim 1 in which the elements of the colorant density array identify colorant density values associated with a plurality of colors.

4. An image rendering system as defined in claim 3 in which at least some of said elements identify, for at least some of said colors, a plurality of colorant density values.

5. An image rendering system as defined in claim 4 in which said colors include gray, cyan, magenta and yellow.

6. An image rendering system as defined in claim 5 in which a majority of the colorant density values are allocated to the gray color and a minority of the colorant density values are allocated to the yellow color.

7. An image rendering system as defined in claim 6 in which three colorant density values are allocated to the gray color, two colorant density values are allocated to the cyan color, two colorant density values are allocated to the magenta color and one colorant density value is allocated to the yellow color.

8. An image rendering system for generating discrete tone image data for representing continuous tone image data to be rendered by a discrete-tone rendering device, the continuous tone image data including a plurality of continuous-tone pixel values each associated with a pixel, the image rendering system comprising:

A. means for providing a threshold array including a plurality of threshold values;

B. means for providing continuous variation in both image dot frequency and the discrete tone by use of a discrete-tone pixel value array comprising a plurality of array elements each associated with a unique one of said pixel values and of said threshold values, each array element identifying a particular discrete tone pixel value; and C. discrete-tone pixel value supply means for, for each pixel, using the continuous-tone pixel value associated with the pixel and a threshold value from the threshold array to identify an array element of the discrete-tone pixel value array, the discrete-tone pixel value supply means supplying the discrete-tone pixel value of the identified array element to the rendering device for rendering.

9. A method of an image rendering system for rendering discrete tone image data for each color channel of an image of pixels represented by continuous tone image data, said method comprising the steps of:

generating an input array of elements corresponding to the pixels of the image, each said input array element having a continuous tone pixel value obtained from the continuous tone image data;

generating a threshold array of elements each having a threshold tone value, each said threshold array element corresponding to a respective said input array element;

generating a colorant density array of elements each having a colorant density value, each said colorant density array element addressed according to an unique combination of said input array element and said corresponding threshold array element, said colorant density array providing continuous variation in both image dot frequency and colorant density; and rendering the discrete tone image data for each pixel of each color channel of the image in response to the corresponding colorant density array element.

10. The method of claim 9, wherein said step of generating a threshold array comprises generating a stochastic threshold array.

\* \* \* \* \*